United States Patent
Wrobleski et al.

(10) Patent No.: US 6,516,132 B1
(45) Date of Patent: Feb. 4, 2003

(54) METHOD AND APPARATUS FOR IMPROVING THE EFFECTS OF COLOR BURST MODIFICATIONS TO A VIDEO SIGNAL

(75) Inventors: William J. Wrobleski, Sunnyvale, CA (US); Ronald Quan, Cupertino, CA (US)

(73) Assignee: Macrovision Corp, Santa Clara, CA (US)

( * ) Notice: Subject to any disclaimer, the term of this patent is extended or adjusted under 35 U.S.C. 154(b) by 0 days.

(21) Appl. No.: 09/091,661

(22) PCT Filed: Nov. 5, 1996

(86) PCT No.: PCT/US96/17719

§ 371 (c)(1),
(2), (4) Date: Jun. 16, 1998

(87) PCT Pub. No.: WO97/26759

PCT Pub. Date: Jul. 24, 1997

Related U.S. Application Data

(63) Continuation-in-part of application No. 08/897,132, filed on Jul. 18, 1997, now Pat. No. 5,784,523, which is a continuation of application No. 08/438,155, filed on May 9, 1995, now abandoned.

(60) Provisional application No. 60/010,015, filed on Jan. 16, 1996, provisional application No. 60/010,779, filed on Jan. 29, 1996, provisional application No. 60/014,246, filed on Mar. 26, 1996, provisional application No. 60/024,393, filed on Jun. 28, 1996, and provisional application No. 60/021,645, filed on Jul. 12, 1996.

(51) Int. Cl.[7] .................................................. H04N 5/76

(52) U.S. Cl. .............................. 386/1; 386/94; 380/203; 380/204

(58) Field of Search ....................... 386/1, 94; 380/201, 380/203, 204, 213; 360/60; H04N 5/76, 9/76, 5/92

(56) References Cited

U.S. PATENT DOCUMENTS

| | | | | |
|---|---|---|---|---|
| 4,577,216 A | * | 3/1986 | Ryan | 380/204 |
| 4,626,890 A | * | 12/1986 | Ryan | 380/201 |
| 4,742,544 A | * | 5/1988 | Kupnicki et al. | 380/215 |
| 5,574,787 A | * | 11/1996 | Ryan | 386/94 |
| 5,784,523 A | * | 7/1998 | Quan et al. | 386/94 |
| 6,035,094 A | | 3/2000 | Kori | 386/94 |
| 6,041,158 A | | 3/2000 | Sato | 386/1 |
| 6,064,438 A | * | 5/2000 | Miller | 348/465 |

* cited by examiner

Primary Examiner—Thai Tran
(74) Attorney, Agent, or Firm—Gerow Brill; George Almeida; Frank Nguyen

(57) ABSTRACT

In the known color stripe process for preventing recording of video signals, the color burst present on each line of active video is modified so that any subsequent video tape recording of the video signal shows variations in the color fidelity that appear as undesirable bands or stripes of color error. This color stripe process is improved by a combination of modifying the phase of the color burst on only part of the color burst. Additional improvements were obtained by incorporating techniques of widening the normal color burst envelope towards the trailing edge of horizontal sync and towards the beginning of active video. These techniques are useful in improving the performance of the color stripe process in both the NTSC and PAL color systems. However, additional improvements are described in the PAL system whereby the phase modifications are controlled so as to avoid disturbing the so-called PAL ID pulse. Such avoidance of the PAL ID pulse improves the playability of the color stripe signal in the PAL format.

29 Claims, 14 Drawing Sheets

BURST WINDOW

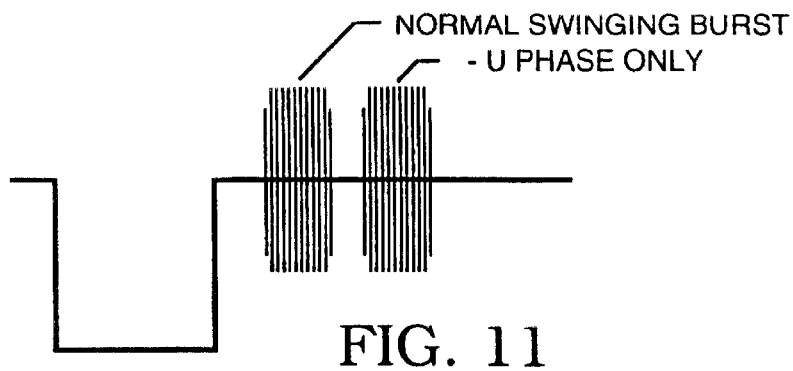
FIG. 11
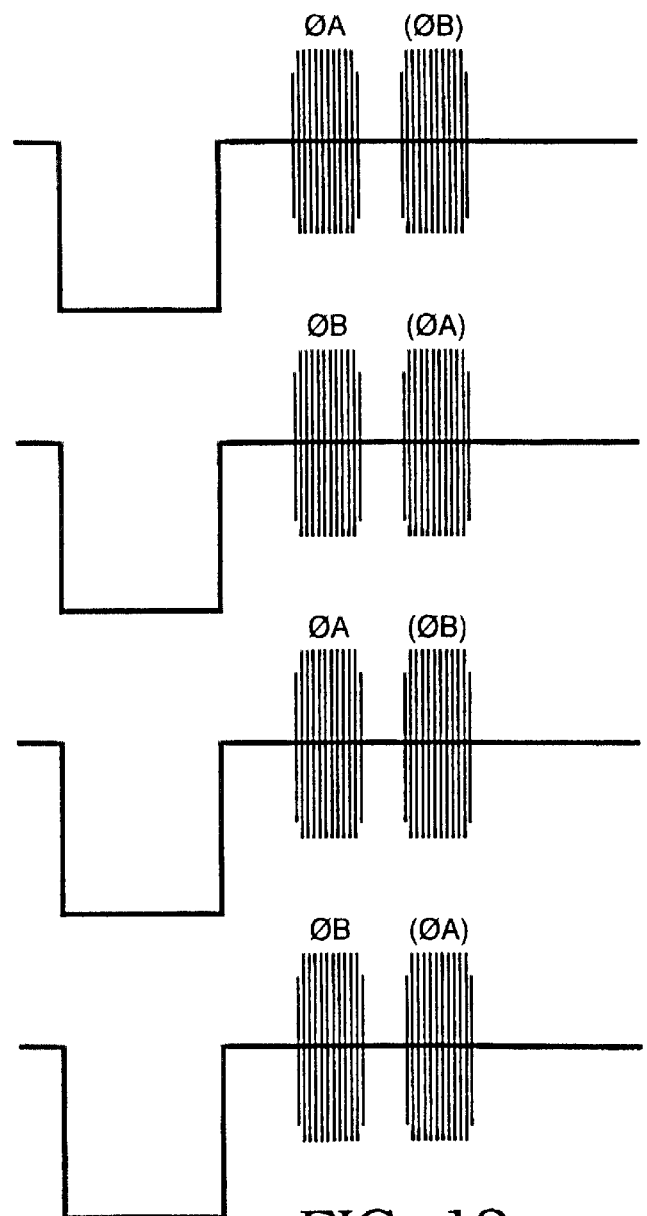
FIG. 12 (SWINGING BURST)

METHOD AND APPARATUS FOR IMPROVING THE EFFECTS OF COLOR BURST MODIFICATIONS TO A VIDEO SIGNAL

CROSS REFERENCE TO RELATED APPLICATION

This application is a continuation-in-part application, of Ser. No. 08/897,132 filed Jul. 18, 1997, now U.S. Pat. No. 5,784,523 which is a continuation of Ser. No. 08/438,155, filed May 9, 1995 now abandoned entitled METHOD AND APPARATUS FOR DEFEATING EFFECTS OF COLOR BURST MODIFICATIONS TO A VIDEO SIGNAL BY Ronald Quan and John O. Ryan.

This application claims the benefit of U.S. Provisional Application Numbers: Ser. No. 60/010015, entitled AN IMPROVED METHOD AND APPARATUS FOR MODIFYING THE COLOR BURST TO PROHIBIT VIDEO-TAPE RECORDING by William J. Wrobleski; filed Jan. 16, 1996; Ser. No. 60/010,779 entitled AN ADVANCED COLOR BURST AND APPARATUS FOR MODIFYING THE COLOR BURST TO PROHIBIT VIDEO TAPE RECORDING by William J. Wrobleski., filed Jan. 29, 1996; Ser. No. 60/014,246 entitled A SYSTEM AND METHOD FOR COPY PROTECTION OF VIDEO RECORDING USING AN ADVANCED AND SPLIT COLOR BURST SYSTEM by William J. Wrobleski filed Mar. 26, 1996; Ser. No. 60/024,393, entitled METHOD OF COPY PROTECTION OF A PAL COLOR VIDEO SIGNAL by William J. Wrobleski filed Jun. 28, 1996; and Ser. No. 60/021,645 entitled METHOD OF IMPROVED COPY PROTECTION OF A PAL COLOR VIDEO SIGNAL by William J. Wrobleski filed Jul. 12, 1996. All of the above co-pending applications are incorporated by reference.

BACKGROUND OF THE INVENTION

1. Filed of the Invention

The present invention pertains to a method and apparatus for processing a video signal, and more particularly to improving the effects of phase modulation of the color burst component of the video signal for video copy protection).

2. Description of the Prior Art

Various copy protection techniques have been developed to modify a video signal so as to prevent copying or reduce the entertainment value of a copied videocassette (effectiveness) while the same signal produces a display on a television receiver or monitor with a minimum of or no visible artifacts.

Video copy protection is defined as a system whereby a copy protected video signal is viewable with a minimum of or no visible artifacts whereby the playback of a recording of such a signal is not possible or produces a signal that has significantly degraded entertainment value. Copy protection is to be differentiated from video scrambling. Video scrambling means that the video signal is not viewable. A scrambled signal may be recordable, but unless it has been descrambled, the playback of such a recording is still unviewable.

A well known copy protection scheme for video signals include is that disclosed in U.S. Pat. No. 4,631,603 ('603), by John O. Ryan, issued on Dec. 23, 1986 and assigned to Macrovision, incorporated by reference. The '603 patent is directed to modifying an analog video signal to inhibit making of acceptable video recordings therefrom. This discloses adding a plurality of pulse pairs to the otherwise unused lines of a video signal vertical blanking interval, each pulse pair being a negative-going pulse followed closely by a positive-going pulse. The effect is to confuse AGC (automatic gain control circuitry) of a VCR (video cassette recorder) recording such a signal, so that the recorded signal is unviewable due to the presence of an excessively dark picture when the recorded signal is played back.

Another well known copy protection is that disclosed in U.S. Pat. No. 4,577,216 ('216), "Method and Apparatus For Processing a Video Signal," John O. Ryan, issued Mar. 18, 1986 and incorporated by reference, discloses modifying a color video signal to inhibit the making of acceptable video recordings thereof. A conventional television receiver produces a normal color picture from the modified signal. However, the resultant color picture from a subsequent video tape recording shows variations in the color fidelity that appear as bands or stripes of color error. Colloquially the modifications are called the "Colorstripe™ system" or the "Colorstripe™ process". Commercial embodiments of the teachings of this patent have typically limited the number of video lines per field having the induced color error or color stripes.

The teachings of the '603 patent are useable in analog video cassette duplication and various digital transmission and recorder playback system such as DVD, DVCR and satellite services utilizing a digital set top decoder. The teachings of the '603 patent depend upon the actions of the AGC of a recorder. The recorders used in the video cassette duplication facilities are specially modified to operate without depending upon this AGC action and can thus record the copy protected signal. The Colorstripe™ system depends upon the color time base recording system of a video cassette recorder. It is not economically possible to modify the duplicating video cassette recorders to record a signal with the teachings of the '216 patent. Thus the Colorstripe™ system is used primarily in transmission systems; on the output of DVD recorders and playback machines; and on the output of DVCR machines. A fuller discussion on how the Colorstripe™ system is incorporated in these systems is discussed below.

Color video signals (both in the NTSC and PAL TV systems) include what is called a color burst. The color stripe system modifies the color burst. The suppression of the color subcarrier signal at the TV transmitter requires that the color TV receiver include an oscillator (in NTSC a 3.58 MHz oscillator) (in PAL a 4.43 MHz oscillator) which is used during demodulation to reinsert the continuous color subcarrier signal and restore the color signal to its original form. Both the frequency and phase of this reinserted subcarrier signal are critical for color reproduction. Therefore, it is necessary to synchronize the color TV receiver's local 3.58 MHz or 4.43 MHz oscillator so that its frequency and phase are in step with the subcarrier signal at the transmitter.

This synchronization is accomplished by transmitting a small sample of the transmitter's 3.58 MHz or 4.43 MHz subcarrier signal during the back porch interval of the horizontal blanking pulse. FIG. 1A shows one horizontal blanking interval for an NTSC color TV signal. FIGS. 1B and 1C show the details the color burst on two lines of the video signal. The phase of the color burst on successive lines in the NTSC are 180 degrees out of phase with each other. The horizontal sync pulse, the front porch and blanking interval duration are essentially the same as that for black and white TV. However, during color TV transmission (both broadcast and cable) 8 to 10 cycles of the 3.58 MHz (in NTSC) subcarrier that is to be used as the color sync signal are superimposed on the back porch. This color sync signal is referred to as the "color burst" or "burst". The color burst peak-to-peak amplitude (40 IRE for NTSC TV as shown) is generally the same amplitude as the horizontal sync pulse.

FIG. 1B shows an expanded view of a part of the waveform of FIG. 1A including the actual color burst cycles. During the color TV blanking intervals, such a color burst is transmitted following each horizontal sync pulse. Similar characteristics for the horizontal blanking interval and color burst are present in a PAL signal. The differences between PAL and NTSC are discussed more fully below.

The phase relationship of the color burst and the color components of an NTSC signal are shown in FIG. 1D. The NTSC color system operates on a quadrature modulation system based upon an R-Y and B-Y or an I and Q system. For ease of discussion, we will discuss the R-Y and B-Y system. As can be seen on FIG. 1D the R-Y axis is the vertical axis and the B-Y axis is the horizontal axis. The Color Burst signal has been specified to be on the B-Y axis and is at the 180 degree point relative to a 0 degree point as shown on FIG. 1D. The color modulation demodulation process depends upon this phase relationship between the various color components shown in the vector diagram of FIG. 1D and the reference subcarrier represented by the color burst signal. The color stripe processes described in the '216 patent and the material below represent a modification of this phase relationship that creates a copy protected signal that has an effectiveness to produce a recording of the signal that has lost its entertainment value while the copy protected signal is displayed without artifacts by a TV receiver or monitor (playability).

The phase relationship of the color burst and the color of an unmodified PAL signal are shown in FIG. 2C.

The PAL color system like its NTSC counterpart operates on a quadrature modulation system based upon an U axis and V axis. As can be seen on FIG. 2C the V axis is the vertical axis and the V axis is the horizontal axis. One of the key differences between the NTSC color system and the PAL TV system is the vector location of the color burst. The PAL Color Burst signal has been specified to be at +/−45 degrees from the −U Axis relative to a 0 degree point as shown on FIG. 2C. On an alternating line basis the V signal switches 180 degrees in phase. The color burst of each of these switches in synchronization. On the lines with a +V signal, the color burst is at +45 degrees relative to the U axis. On the lines with a −V signal, the color burst is at −45 degrees relative to the U axis. The color modulation demodulation process depends upon this phase relationship between the various color components shown in the vector diagram of FIG. 2C and the reference subcarrier represented by the color burst signal. The so called swinging burst is used to generate a PAL ID pulse within the demodulation process to appropriately switch the demodulation process to respond to the line by line change in the V portion of the signal. Due to the unique characteristics of the PAL TV signal there is a need for an improvement on the color stripe processes described in the '216 patent to improve to create a copy protected signal that has an effectiveness to produce a recording of the signal that has lost its entertainment value while the copy protected signal and to improved the display of the signal without artifacts by a TV receiver or monitor. For further details on the PAL Color TV system see "Color Television" by Geoffrey Hutson, Peter Shepherd, and James Brice, published by McGraw Hill Book Company,(UK) Limited, Maidenhead, Berkshire, England.

In the embodiments of the color stripe process, no color burst phase (stripe) modification appears in the video lines that have a color burst signal during the vertical blanking interval. These are lines 10 to 21 in an NTSC signal and corresponding lines in a PAL signal. The purpose of keeping these lines modified is to improve the playability of the modified signal. Since these lines are not visible on the playback of a recording there is no improved effectiveness to be achieved by modifying these lines. The previous commercial embodiments of the color stripe modifications (modulation of the color burst phase) have occurred in bands of four to five video lines of the viewable TV field followed by bands of eight to ten video lines without the color stripe modulation. The location of the bands is fixed ("stationary") field-to-field. This color stripe process has been found to be quite effective for cable television, especially when combined with the teachings of the '603 patent discussed above.

In NTSC TV, the start of color burst is defined by the zero-crossing (positive or negative slope) that precedes the first half cycle of subcarrier (color burst) that is 50% or greater of the color burst amplitude. It is to be understood that the color stripe process shifts the phase of the color burst cycles relative to their nominal (correct) position which is shown in FIG. 1B. The phase shifted color burst is shown in FIG. 1D. The amount of phase shift shown in FIG. 1C may be as great as 180° (the maximum possible).

Further, the amount of phase shift in the color stripe process can vary from e.g. 20° to 180°; the more phase shift, the greater the visual effect in terms of color shift. In a color stripe process for PAL TV, a somewhat greater phase shift (e.g. 40° to 180°) is used to be effective.

In any copy protection system there is a need for a proper balance between the effectiveness of the copy protected signal in the making of a deteriorated copy versus the need for no visible effects on the playability of the copy protected signal. However, certain television sets may produce slight playability problems when displaying a signal with embodiments of the '216 patent. In particular, the visibility of the color stripe on a television receiver has been found to be particularly noticeable in certain "picture in picture" ("p-i-p")portions of the TV display. These systems use analog to digital conversion and digital to analog conversion techniques to accomplish the "p-i-p" feature that may be sensitive to the phase errors of the '216 embodiment. Therefore, it is an object of this invention to provide an improved method and apparatus for modifying a color video signal so that a conventional television receiver produces a normal color picture including the picture in picture portion from the modified signal, whereas a videotape recording made from the modified signal exhibits annoying color interference, thus discouraging or inhibiting videotaping of the signal.

Other variations of the Colorstriper™ process are also possible.

SUMMARY

The present invention is directed to a method and apparatus that satisfies the need for an for an improved method and apparatus for modifying a color video signal so that a conventional television receiver produces a normal color picture including the picture in picture portion from the modified signal, whereas a videotape recording made from the modified signal exhibits annoying color interference, thus discouraging or inhibiting videotaping of the signal.

The present inventors have determined that improvements are possible on the teachings of above mentioned U.S. Pat. No. 4,577,216, especially pertaining to playability of the signal on a television receiver or monitor.

In a first embodiment, it has been found that it is not necessary to completely modify a color burst. With typical commercially available television sets and VCRs, modifying or modulating only part of some of the color bursts has been found effective in making a copy protected signal while improving the playability on television receivers and monitors.

A second embodiment improves the playability of the modified signal by extending the color burst signal forward into the so called breezeway portion of the television signal.

A third embodiment additionally improves the playability by extending the burst signal beyond the normal end point to just prior to active video. With both the second and third embodiments, various combinations of modified or modulated burst signal with unmodified or unmodulated burst signal are used to optimize the effectiveness of the copy protection and the playability of the modified signal.

Within the NTSC color system each of the first three embodiments, the phase of the modified versions is generally 180 degrees from the nominal burst position. Other phase angles are also usable. These three embodiments are useful in the PAL color system as well.

However, some specialized embodiments are described that take advantage of the differences in the PAL system from the NTSC system. In the PAL embodiments, the modified lines comprise a phase shift of either +90 degrees relative to the burst phase angle of a normal line or −90 degrees relative to the burst phase of the burst phase of a normal line. The differences between various PAL embodiments is the sequence of line modifications.

It is to be understood that in each of these embodiments it has been found that it is not necessary to modify or modulate all of a particular color stripe burst.

BRIEF DESCRIPTION OF THE DRAWING

These and other features, aspects, and advantages of the present invention will become better understood with regard to the following description, appended claims and accompanying drawings where:

FIG. 11 shows a waveform illustrating various versions of a fourth PAL embodiment of the color stripe process in accordance with the invention; and FIG. 12 shows waveforms illustrating a swinging burst embodiment of the color stripe process in accordance with the invention.

DETAILED DESCRIPTION

The following describes a number of embodiments for an improved method and apparatus for modifying a color video signal so that a conventional television receiver produces a normal color picture including the picture in picture portion from the modified signal, whereas a videotape recording made from the modified signal exhibits annoying color interference, thus discouraging or inhibiting videotaping of the signal.

First is a description relating to waveforms and methods. Second is a description of various related circuits.

Method Description

The following are various color stripe methods in accordance with the invention.

A key inventive concept in each of the embodiments described is that it has been found that it is not necessary to modify or modulate all of a particular color stripe burst. It has been found that modifying or modulating only a portion of a color stripe burst is still effective as a copy protection signal for a typical VCR. Also, it has been found that reducing the portion of the burst that is modified or modulated improves the playability of the copy protected signal on television receivers and monitors. This modification or modulation of only a portion of a specific color burst signal is colloquially called a split color burst signal. Variations of this split color burst concept comprise the various embodiments described below.

Figure 1A:
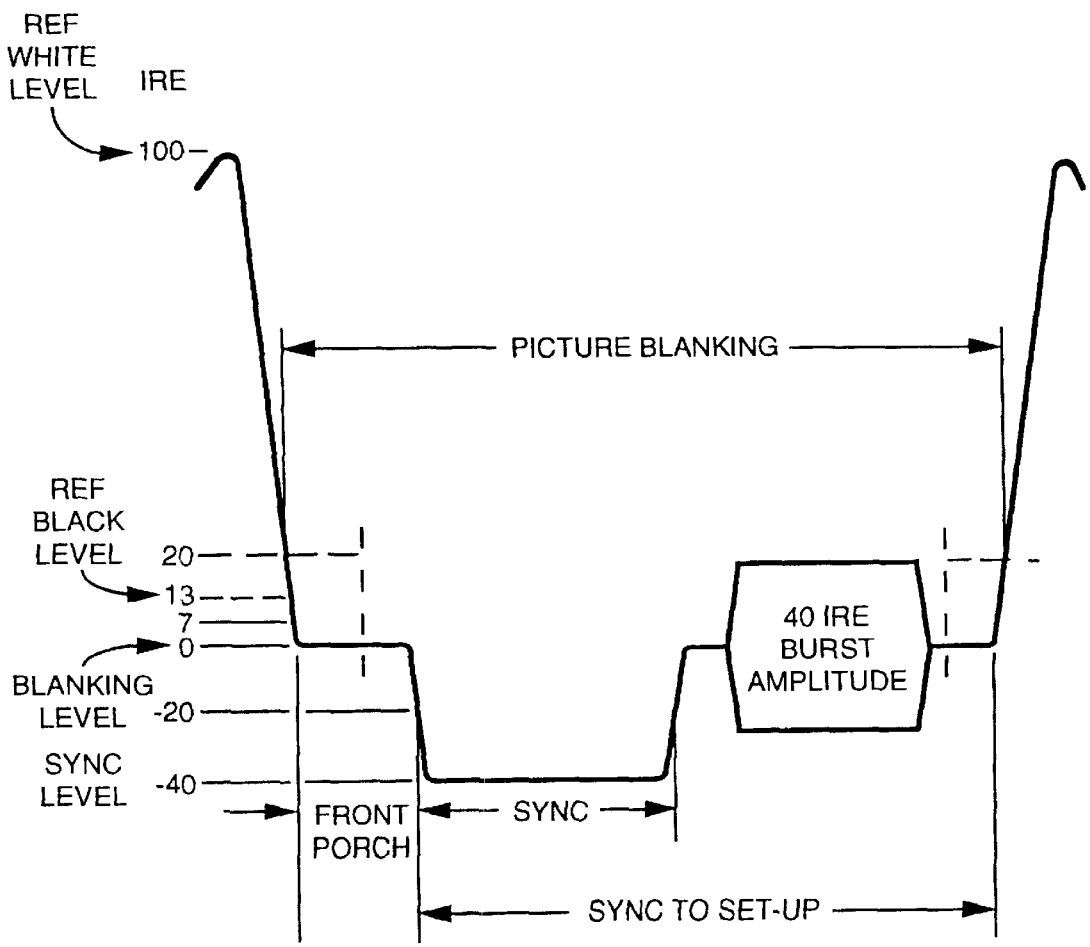
FIGS. 1A through 1C show standard NTSC TV waveforms.
Figure 1B:
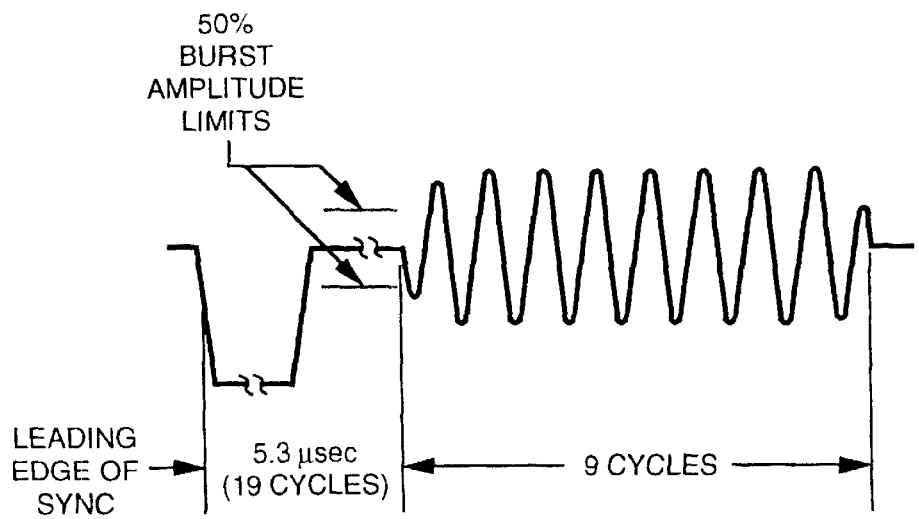
Figure 1C:
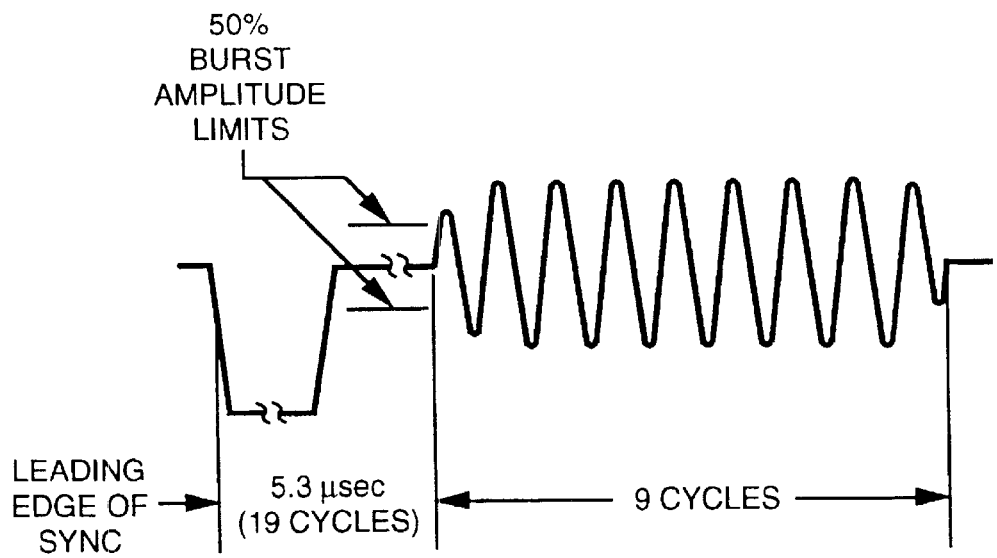
Figure 1D:
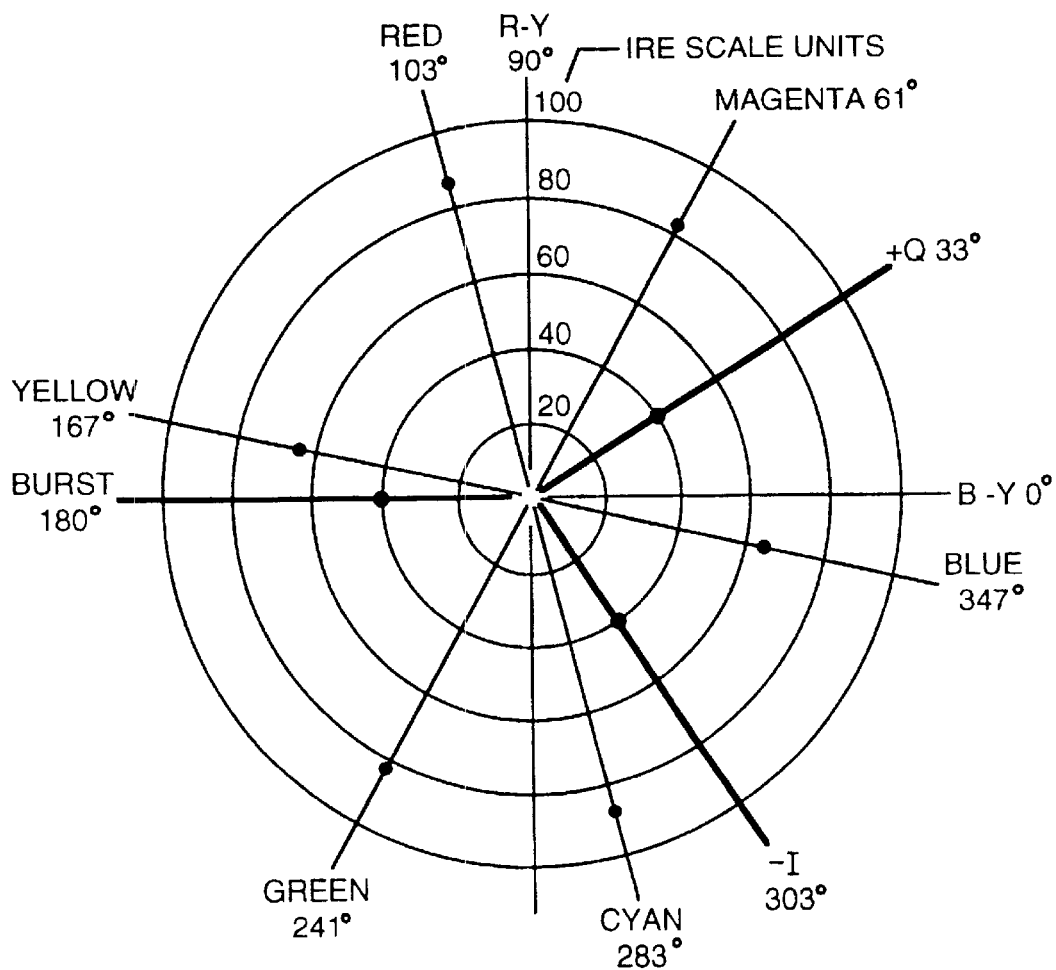
FIG. 1D shows a vector diagram of an unmodified NTSC signal.

FIGS. 3A through 3G show various versions of a split color burst signal that are contained within the standard position of a color burst signal. This standard position of a color burst signal is shown in FIG. 1D (for NTSC) and FIGS. 2B and 2C (for PAL).

Figure 3A:
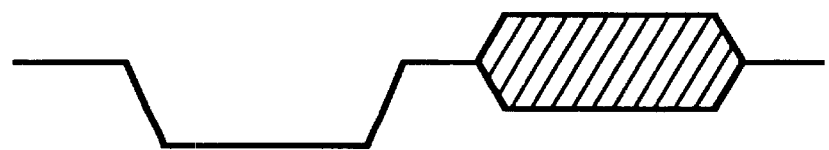
FIGS. 3A to 3E show waveforms illustrating various versions of a first embodiment of the color stripe process in accordance with the invention.

FIG. 3A shows a color burst with a full burst modification or modulation (the hatching denotes a modified burst signal). FIG. 3C shows a color burst signal with a approximately. half of the first portion of the normal burst duration unmodified and the remaining portion of the normal color burst duration having a modified or modulated burst phase as shown by the hatching. The amount of phase modification may as little as 20 degrees from normal phase to a maximum of 180 degrees from normal phase.

This replacement may be of only a portion of a particular color burst. For instance, of the standard eight to ten cycles of NTSC color burst, one may replace e.g. the first five cycles, the last five cycles, or any other group of e.g. four to six cycles. The replaced cycles need not be consecutive; one may replace alternate cycles, leaving "good" (corrected) cycles interspersed with "bad" (color stripe) cycles. It also is possible to add corrected color burst cycles outside of their normal location and overlying the horizontal sync pulses, since these will be detected by a VCR. It is to be understood that the recognition by the present inventors that only a portion of a particular color burst need be replaced forms a part of the invention. Moreover, the partial replacement is also applicable to other of the embodiments described hereinafter.

Figure 3B:
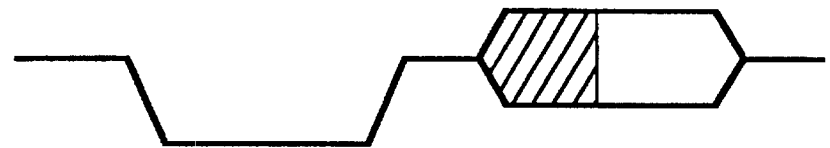
Figure 3C:
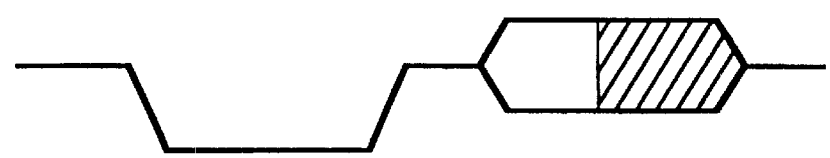

FIG. 3B shows a version of split color burst where the modified portion is within a first portion of the normal color burst duration and the unmodified portion is in the later portion of the normal burst duration.

Figure 3D:
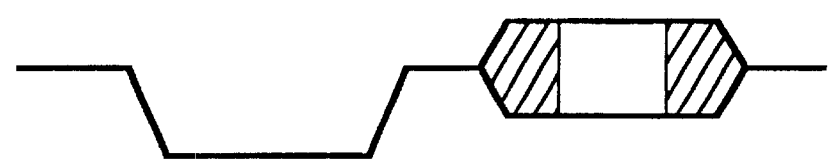
Figure 3E:
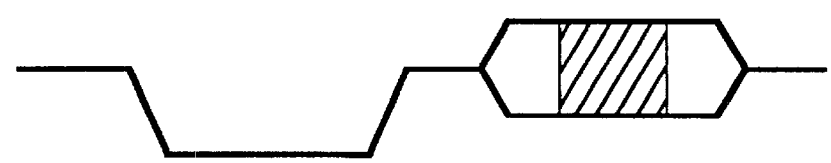

FIGS. 3D and 3E show where the unmodified color burst and modified color burst portions are positioned in a sandwich manner within the normal color burst duration. FIG. 3E shows the unmodified portions to be on the ends of the normal burst duration with the modified portion being in the middle. The amount of modified portions versus the unmodified portion is adjusted for an optimum balance between effectiveness and playability as discussed above.

FIG. 3D shows where the unmodified color burst and modified color burst portions are positioned in a another sandwich manner within the normal color burst duration. FIG. 3D shows the modified or modulated portions to be on the ends of the normal burst duration with the unmodified portion being in the middle. The amount of modified or modulated portions versus the unmodified or unmodulated portion is adjusted for an optimum balance between effectiveness and playability as discussed above.

Figure 4A:
FIGS. 4A to 4B show waveforms illustrating various versions of a second embodiment of the color stripe process in accordance with the invention.
Figure 4B:
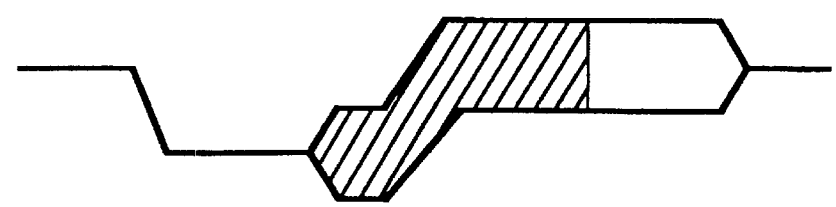

FIGS. 4A and 4B show embodiments of a version of the color stripe process colloquially called advance split burst. In these versions it was determined that playability was improved by advancing the area within the back porch where the color burst (modified or unmodified) would exist.

FIG. 4A shows a basic combination of the advanced concept with a split color burst. In this particular version the burst envelope is extended forward to the trailing edge of horizontal sync. As shown in FIG. 4A, the color burst comprises a modified or modulated color burst from the trailing edge of sync through and into a portion of the normal burst duration. The remainder of the normal burst duration has an unmodified burst portion.

FIG. 4B shows another version of the advanced split color burst. Here the color burst envelope begins during the horizontal sync duration and continues into the normal color burst duration. As in the previous version of the advanced split color burst, the remaining color burst signal within the normal color burst duration is an unmodified color burst.

One of the advantages of having the advanced split color burst in the NTSC system is that the detection area of the color burst signal in a VCR tends to be closer to the trailing edge of horizontal sync than does the detection area of the color burst in a television receiver or monitor. Thereby, in the NTSC system with an advanced split color burst, the VCR tends to lock onto a modified signal and the television receiver tends to lock onto an unmodified signal.

FIGS. 4A and 4B show the advanced split color burst system with the unmodified or unmodulated version in the first portion of the advanced color burst. It should be understood as will be shown later that a combination of the advanced split color burst could use the "sandwich" approach discussed above is another possible variation of the color stripe system.

Figure 5A:
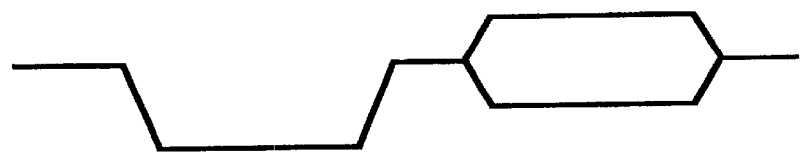
FIGS. 5A to 5E show waveforms illustrating various versions of a third embodiment of the color stripe process in accordance with the invention.
Figure 5B:
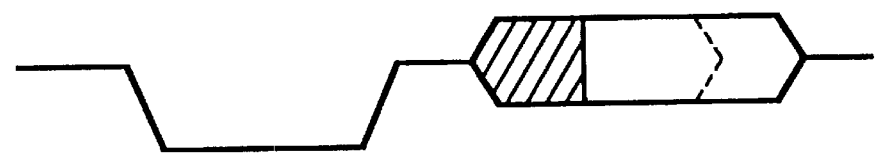
Figure 5C:
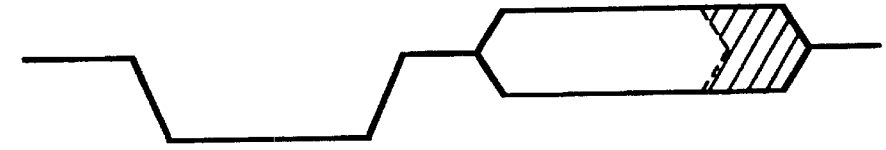
Figure 5D:
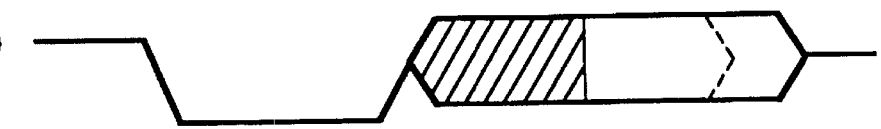
Figure 5E:
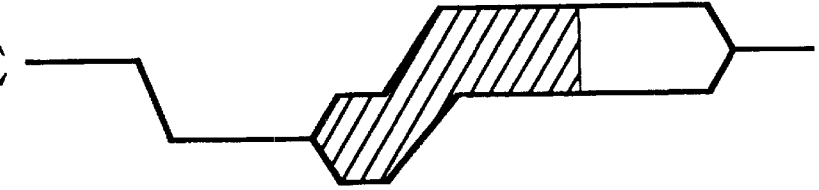

FIGS. 5A through 5E show another embodiment of the split color burst system. As shown in FIGS. 5A through 5E there are advantages to having the normal burst envelope extended forward to a point that may extend as far as the front porch area of the horizontal blanking area. It has also been found to be advantageous to extend the normal color burst envelope beyond the normal burst period towards the active picture area. This extension of the normal is limited only by the maximum horizontal blanking area and the start of active video. FIG. 5A shows a normal unmodified color burst. FIG. 5B shows an extended color burst with an indication of the end of normal color burst. The extended period may have normal color burst or modified or modulated color burst. FIG. 5C shows an example of a color burst signal having the earlier portion contain normal color burst and the later portion including the extended portion containing modified or modulated color burst. FIG. 5D shows the reverse. The point at which the switching between modified color burst and unmodified color burst occurs is variable and subject to experimental results for the maximum balance between effectiveness and playability as discussed above.

Figure 6A:
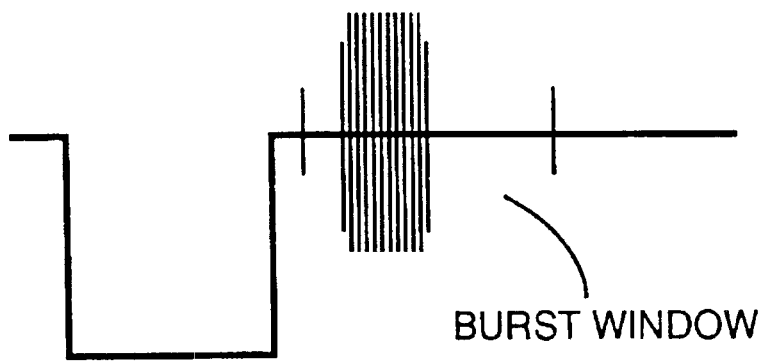
FIGS. 6A through 6C show waveforms of an embodiment using the split burst concept without any modified burst.
Figure 6B:
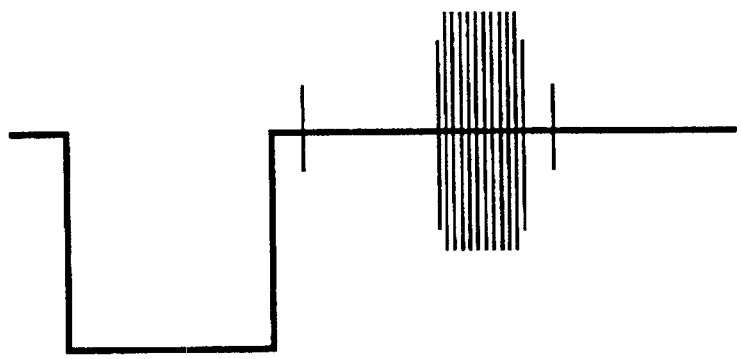
Figure 6C:
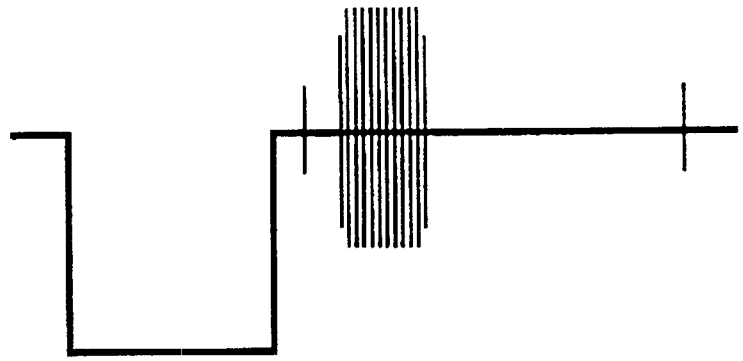

FIGS. 6A through 6C show an embodiment of the modification to the color burst where there is no area of modified burst. However, the concept of split color burst prevails when the width of the normal color burst envelope is narrowed. In this embodiment, the number of cycles of color burst is reduced. As shown in FIGS. 6A through 6C the shortened color burst is varied in its position within the normal color burst window. On the lines containing this modification, disturbances to the color fidelity will occur in a recording of the signal, but the playability within a TV receiver or monitor is maintained.

Each of the embodiments discussed in FIGS. 3A through 3E, FIGS. 4A through 4B, FIGS. 5A through 5E and FIGS. 6A through 6C are applicable to the NTSC color format and the PAL color format.

Figure 7:
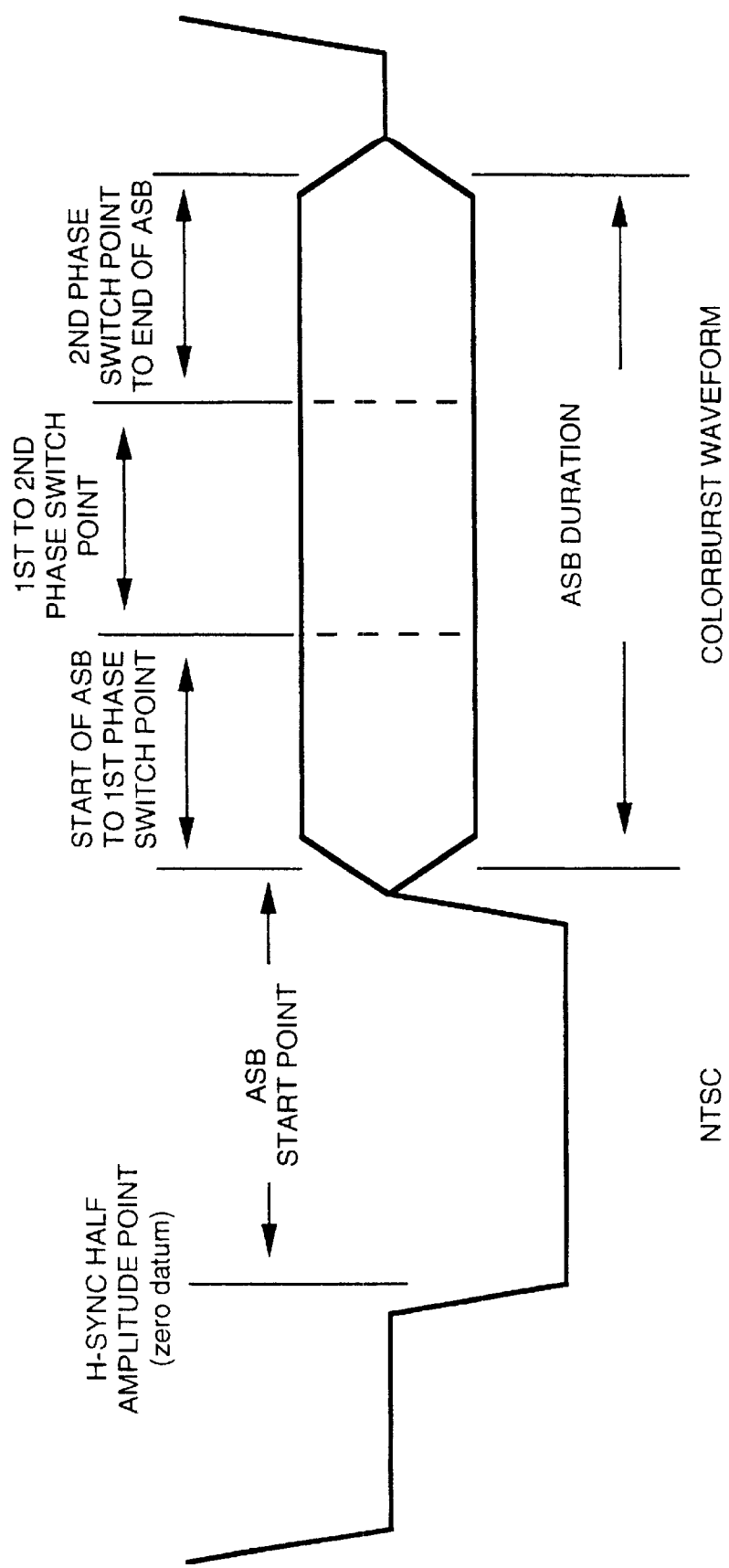
FIG. 7 shows an exemplary embodiment that combines the embodiment described in FIGS. 3A through 3C, FIGS. 4A through 4B and FIGS. 5A through 5C.

FIG. 7 shows an NTSC exemplary embodiment that combines the elements of the above identified embodiment. The NTSC exemplary embodiment, called Advanced Switched Burst (ASB) has the capability of programming various combinations of the embodiments described above. The burst envelope comprises three zones. Zone 1 (burst start) beginning 4.96 $\mu$secs. after the leading edge of horizontal sync. Zone 1 ends 1.484 $\mu$secs after normal burst start. Zone 2 begins and ends at the end of Zone I. In this particular embodiment, there is no Zones 2 and 3 per se. begins after the Zone II point and extends 1.48 $\mu$secs. to the end of burst. Therefore, this particular embodiment, color burst has a width of 4.96 $\mu$secs. The Zone I area will contain modified (inverted 180°) subcarrier. Normal phase subcarrier is used in Zone 2 (zero duration and Zone 3.

As discussed above, the number of lines containing modified or inverted subcarrier in the color burst area is limited to groups of lines followed by larger groups of line not containing modified or inverted subcarrier in the color burst. The exemplary embodiment discussed above is available in two basic versions. One is called the 2 line version and the second is called the 4 line version. Table 1a shows the exmplary embodiment of a Colorstripe™ measurements for NTSC. Table 1a.2 shows both line number configurations. Other combinations are possible. The exemplary embodiment is the result of experimental work towards finding an optimal mix of playability and effectiveness discussed above.

TABLE 1a

Summary of 525/60/NTSC Measurements

| Parameter | Measurement (±S) |
|---|---|
| Burst Normal Start Point (Colorstripe Line) | 5.3 ±0.15 |
| Burst Advanced Start Point (Colorstripe Line) | 4.96 ±0.15 (Note 1) |
| Envelope Rise Time 10%–90% | 0.3 +0.1/−0.2 |
| Burst Start to First Phase Switch Point | 1.48 ±0.07 |
| First to second phase switch points | 0 |
| Second Phase Switch Point to end of burst | 1.48 ±0.15 (Note 1) |
| Envelope Fall Time 10%–90% | 0.3 +0.1/−0.2 |

Note 1: Start and End points must be such that total burst duration for the default configuration is 2.96+0.15/−0.07

TABLE 1b

LINE NUMBERS INCORPORATING ADVANCED SPLIT BURST WAVEFORM (NTSC)

| Stripe No. | Advanced Split Burst 4-Line version (21-Line Spacing) First line in stripe | | Advanced split Burst 2-Line version (17-Line Spacing) First line in stripe | |
|---|---|---|---|---|
| | Field 1 | Field 2 | Field 1 | Field 2 |
| 1 | 24 | 297 | 30 | 301 |
| 2 | 45 | 318 | 47 | 318 |
| 3 | 66 | 339 | 64 | 335 |
| 4 | 87 | 360 | 81 | 352 |
| 5 | 108 | 381 | 98 | 369 |
| 6 | 129 | 402 | 115 | 386 |
| 7 | 150 | 423 | 132 | 403 |
| 8 | 171 | 444 | 149 | 420 |
| 9 | 192 | 465 | 166 | 437 |
| 10 | 213 | 486 | 183 | 454 |
| 11 | 234 | 507 | 200 | 471 |
| 12 | | | 217 | 488 |
| 13 | | | 234 | 505 |

As discussed above, these embodiments are applicable to the NTSC system as well as the PAL system. However, since the PAL uses the color burst in a slightly different way from NTSC, four embodiments of PAL only color stripe systems are described below.

Figure 2A:
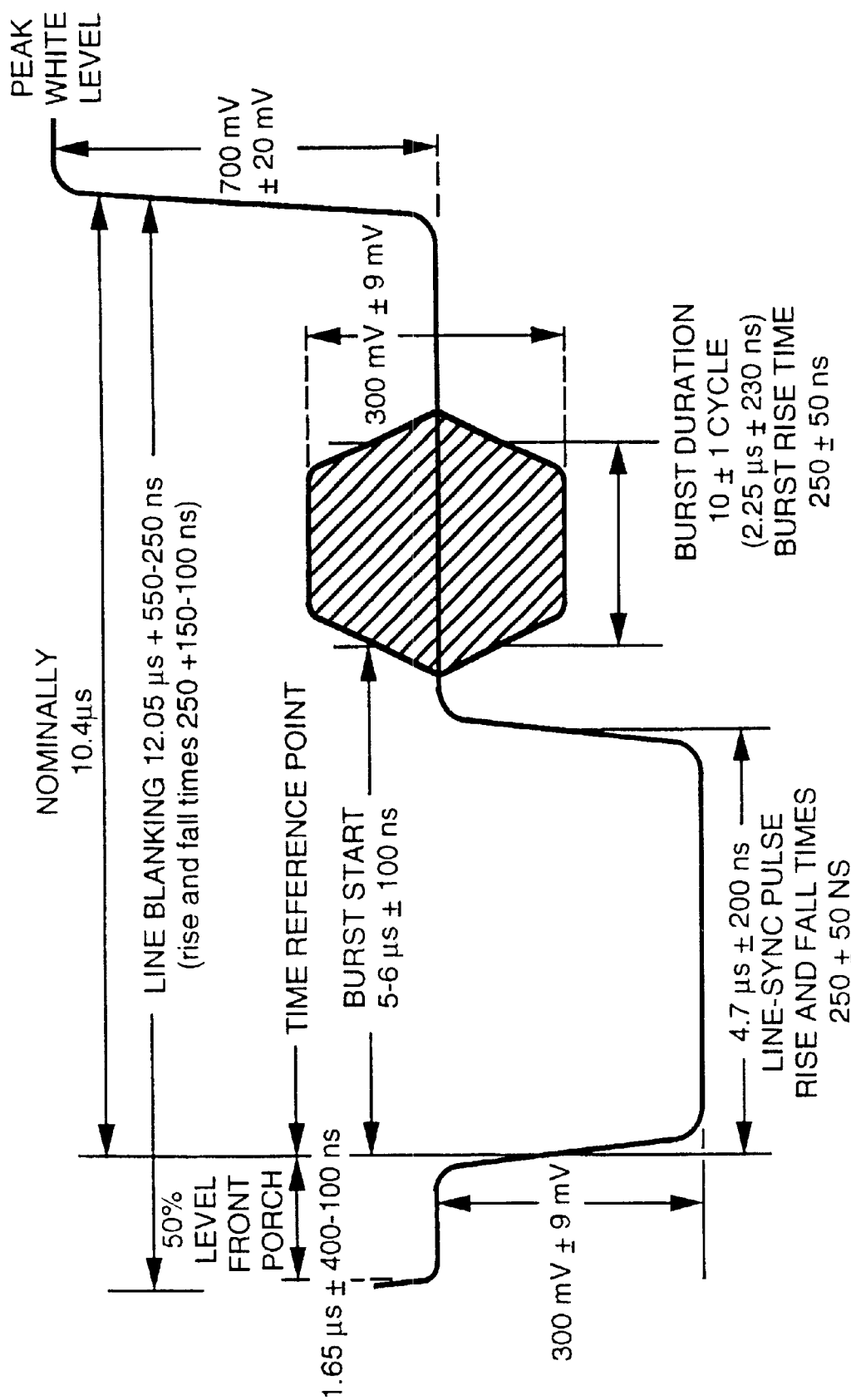
FIG. 2A shows a standard PAL TV waveform.
Figure 2B:
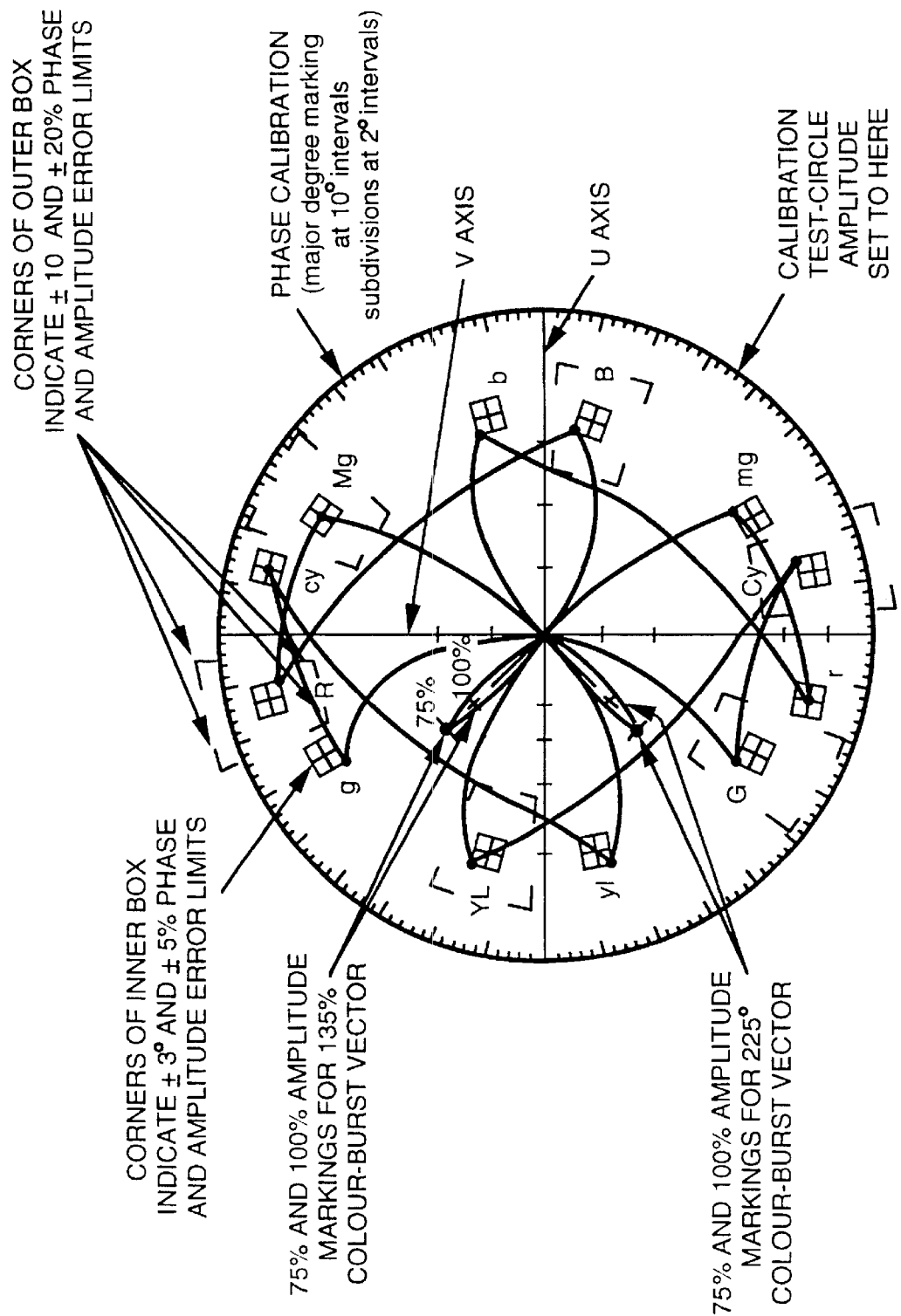
FIGS. 2B and 2C show a vector diagram of an unmodified PAL signal.
Figure 2C:
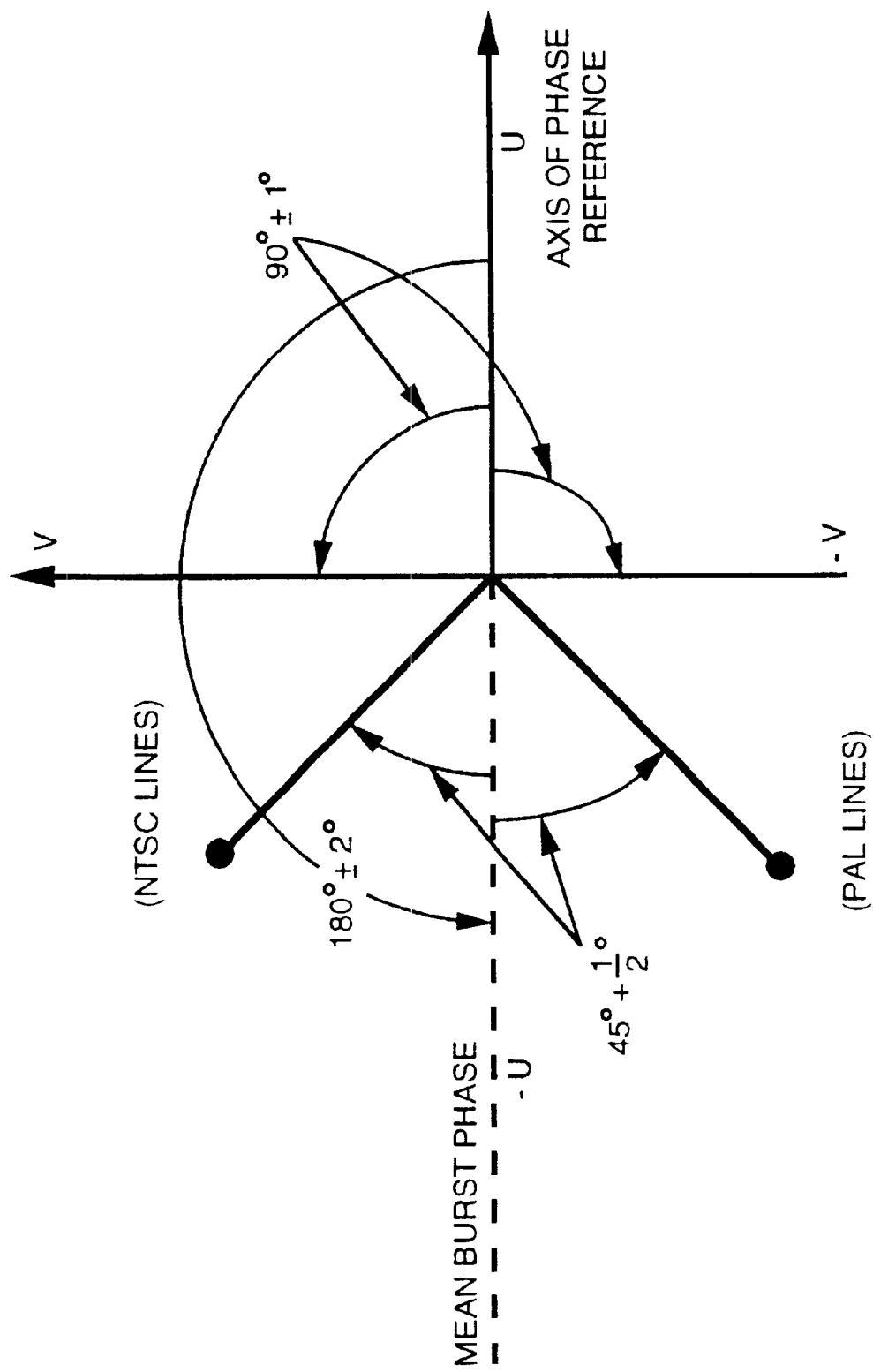

The standard PAL color signal has several significant differences from the standard NTSC signal. Some of these differences are related to the scanning standard used. These scanning differences create the need for different subcarrier frequency. However, the most significant difference is the use of the swinging burst and the alternating phase relationships between adjacent lines within a field. FIG. 2A shows one horizontal blanking interval for an PAL color TV signal. FIGS. 2B and FIG. 2C show the vector display of a color bar signal color burst details in a PAL system. One skilled in the art would fully understand that there is a 180 degree change in the V component of every color component on a line by line basis. Additionally as can be seen from FIG. 2C there is a corresponding phase change in the color burst signal on a line to line basis. The color burst component and color components that occur when the burst is the +45 degree point relative to the U Axis are the so called NTSC lines. The color burst component and color components that occur when the burst is the −45 degree point relative to the U Axis are the so called PAL lines.

In the NTSC system the phase of the color burst is 180 degrees to the color signals 0 degree phase reference. For a PAL signal, however, the color burst also has to identify the V portion of the subcarrier phase which is switched during transmission by 180 degrees on alternate lines. The burst phase is therefore also switched on alternate lines and is at 135 degrees on NTSC lines and 225 degrees on PAL lines. The PAL line identification at the receiver may then be achieved by the phase detection of the 180+/−45 degree switched or swinging burst. As can be seen in FIG. 2B the chroma signal switches about the U Axis such that for example a blue signal appears at approximately 350° relative to 0° on the line when color burst is at 135°. A blue signal is at approximately 10° relative to 0° on the line when the color burst is at 225°.

Figure 8A:
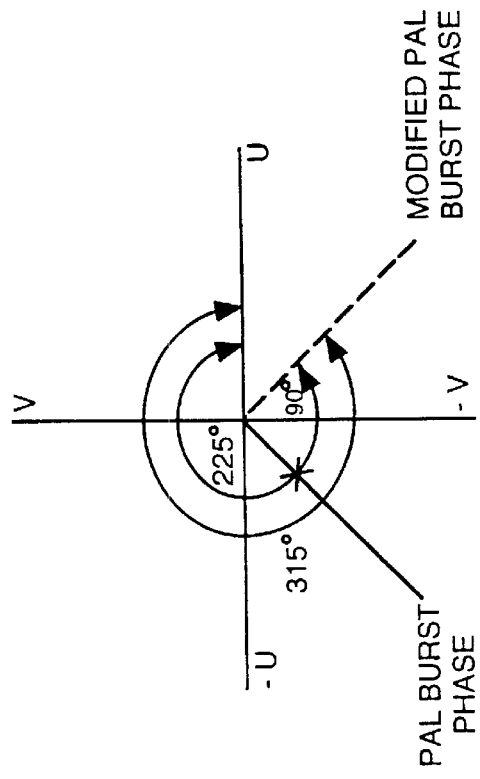
FIGS. 8A to 8D show vector diagrams illustrating a first PAL embodiment of the color stripe process in accordance with the invention.
Figure 8B:
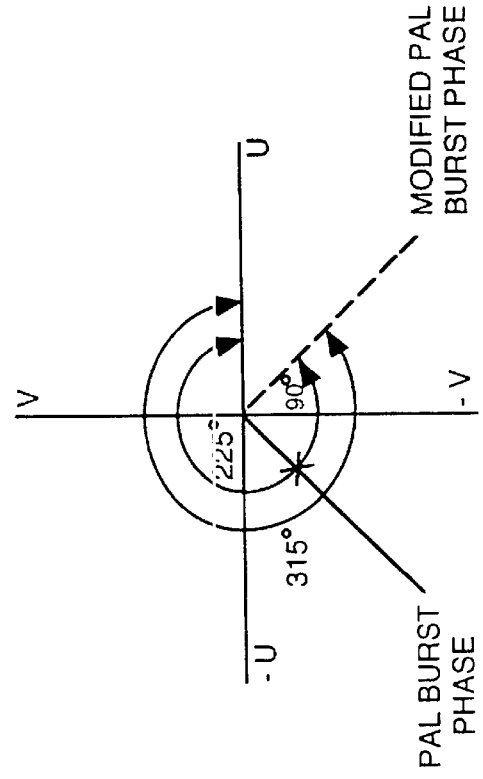
Figure 8C:
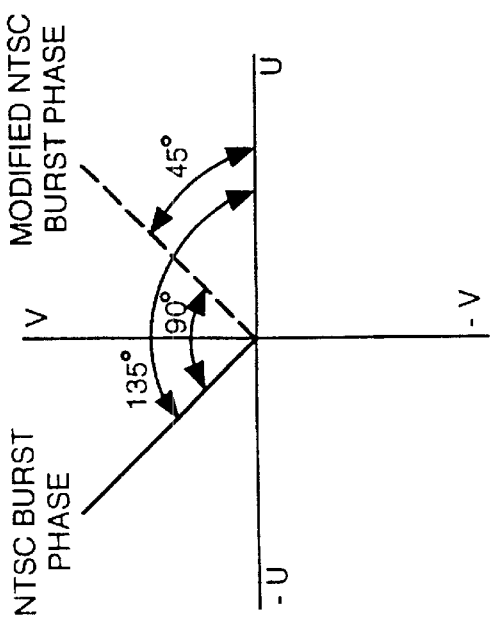
Figure 8D:
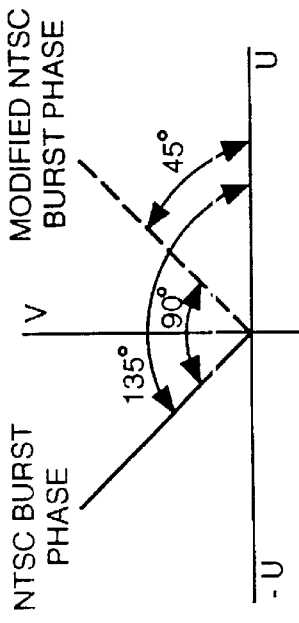

One embodiment of the invention utilizes the four line color stripe group as discussed above. In an unmodified signal, the first line of such a four line group would have a so-called NTSC burst angle of 135 degrees as shown in FIG. 8A. The second line of the four line group would be the so-called OPAL burst angle of 225 degrees as shown in FIG. 8B. The same pattern repeats in the third and fourth lines of the four line pattern. The remaining lines follow the same normal pattern.

However, the embodiment of the invention has the phase angles in the four line pattern modified as shown by dotted lines in FIGS. 8A through 8D. The so-called NTSC burst angle of line 1 and 3 moved 90 degrees to an angle of 45 degrees. The so called PAL burst angle of lines 3 and 4 are moved 90 degrees to 315 degrees. The invention is not limited to a four line sequence. It is possible that a 2, 4, 6, 8, or more line sequence will be effective.

The advantage of this copy protection method is that the so called PAL ID pulse pattern generated by the +/−45 degree from the U axis is unchanged. The television receiver is not affected by the changes of the phase angles relative to the V axis as shown in FIGS. 8A through 8D. However, the color time base processing in a recording VCR is disturbed by such a variation from the standard signal. Variations of this embodiment may include phase angle changes other than 90 degrees, so long as the PAL ID pulse is not disturbed.

Figure 9:
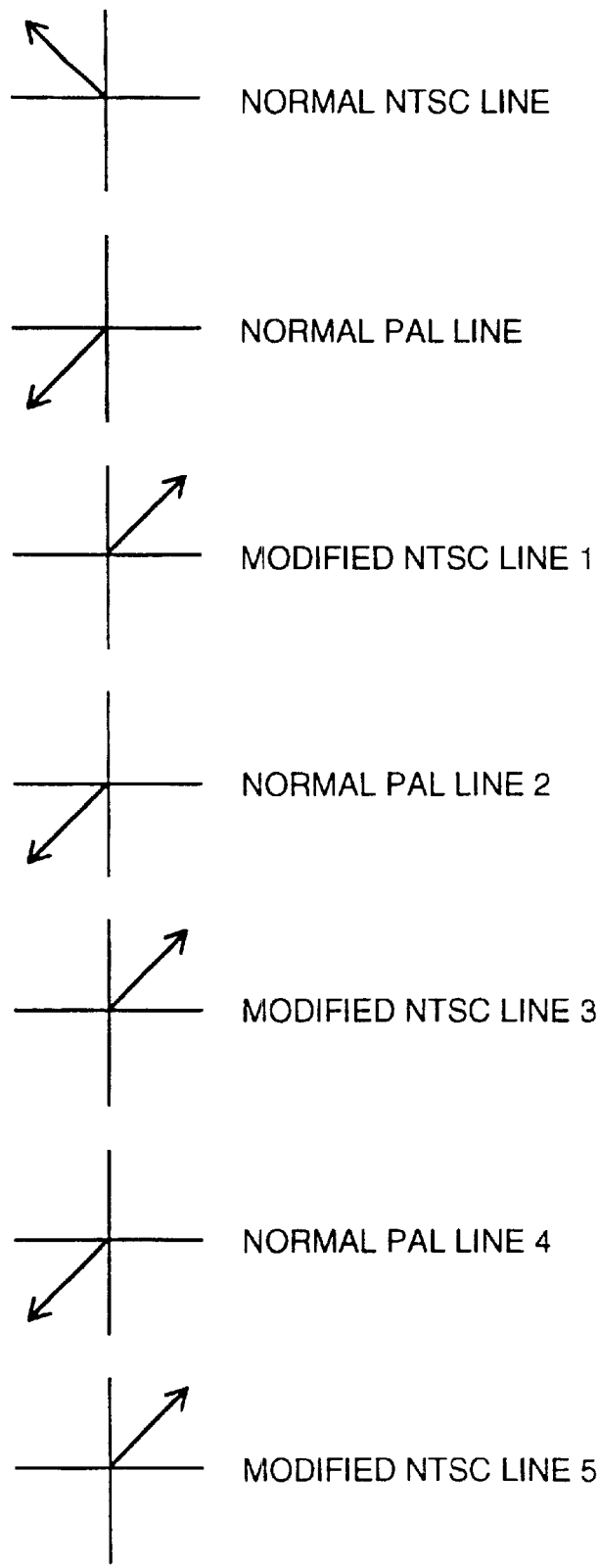
FIG. 9 shows a series of vector diagrams illustrating a second PAL embodiment of the color stripe process in accordance with the invention.

Another embodiment as shown in the vector diagrams in FIG. 9 has a one line modification of the color burst signal in between lines having the normal color burst signal. It has been found through experimental testing that the playability of the modified signal may be improved by using variations of a one line version of the signal modification. As an example in a five line portion of a field, the first line may be a modified NTSC line, followed by an unmodified PAL line in turn followed by a modified NTSC line, followed by an unmodified PAL This five line sequence is shown in the last five vector diagrams of FIG. 9, sequence could also have modified PAL lines with unmodified NTSC lines. The five line sequence can also be a lower number of lines or a greater number of lines. It has been found experimentally that there is a need for approximately 34 line groups of unmodified lines for TV monitor playability purposes.

The advantage of this copy protection method is that the so called PAL ID pulse pattern generated by the +/−45 degree from the U axis is unchanged. The television receiver is not affected by the changes of the phase angles relative to the V axis as shown in FIGS. 8A–8D. However, the color time base processing in a recording VCR causes color phase errors by such a variation from the standard signal. Variations of this embodiment may include phase angle changes other than 90 degrees, so long as the PAL ID pulse is not disturbed.

Figure 10:
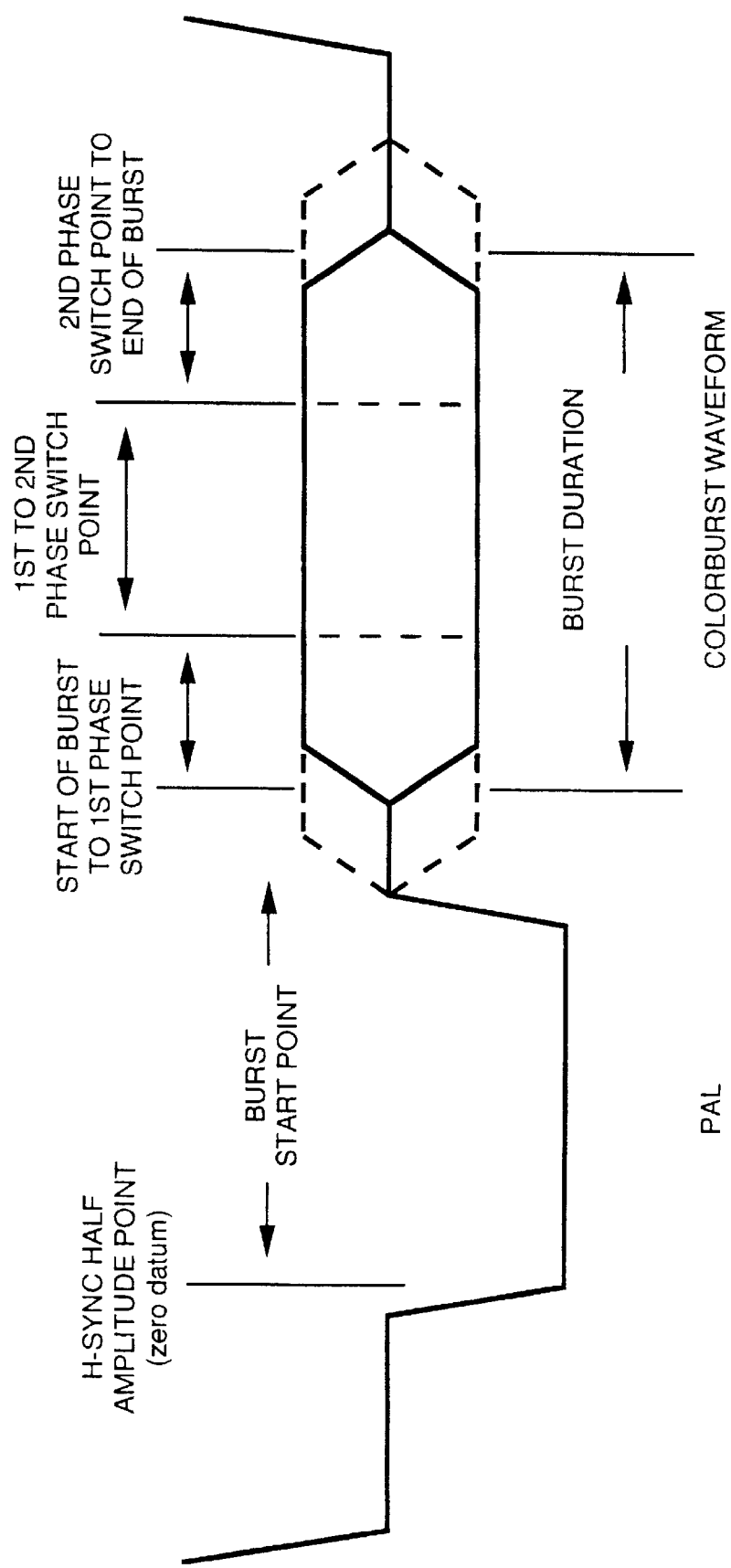
FIG. 10 shows a waveform of an exemplary embodiment of a PAL version of the invention.

Table 2a and FIG. 10 show an exemplary embodiment of color stripe measurements for PAL. Table 2b shows both line number configurations. In Table 2a, the line numbers indicate the first line of a two or three line sequence. In the two line sequence, there are two lines containing modified color burst followed by 32 lines of unmodified color burst. In the three line sequence, there are three lines containing modified color burst followed by 31 lines of unmodified color burst. Other combinations are possible. The exemplary embodiment is the result of experimental work towards finding an optimal mix of playability and effectiveness discussed above.

TABLE 2a

Summary of 625/50/PAL Measurements

| Parameter | Measurement (±S) |
| --- | --- |
| Burst Normal Start Point (Colorstripe Line) | 5.6 ±0.15 (Note 1) |
| Burst Advanced Start Point (Colorstripe Line) | 4.96 ±0.15 |
| Envelope Rise Time 10%–90% | 0.3 +0.1/−0.2 |
| Burst Start to First Phase Switch Point | 1.185 ±0.07 |
| First to second phase switch points | 0 |
| Second Phase Switch Point to end of burst | 1.185 ±0.15 (Note 1) |
| Envelope Fall Time 10%–90% | 0.3 +0.1/−0.2 |

Note 1: Start and End points must be such that total burst duration for the default configuration is 2.25+0.15/−0.07

TABLE 2b

LINE NUMBERS INCORPORATING COLORSTRIPE BURST WAVEFORM (PAL)

| | Colorstripe Burst 2 or 3-Line version (34-Line Spacing) First line in stripe | |
| --- | --- | --- |
| Stripe No. | Even Field | Odd Field |
| 1 | 27 | 356 |
| 2 | 61 | 390 |
| 3 | 95 | 424 |
| 4 | 129 | 458 |
| 5 | 163 | 492 |
| 6 | 197 | 526 |
| 7 | 231 | 560 |
| 8 | 265 | 594 |

NOTES:
1. This table uses the CCIR 625/50/PAL line numbering convention. Subtract 313 from Odd Field line numbers above to obtain line numbers in "Odd Field/L1" to "Odd Field/L312" format.
2. The line numbers listed in the table are the first line of a 2 or 3 line sequence as appropriate.
3. The above configurations are within Rev 6.1 programming range.

FIG. 11 shows another embodiment for a PAL color stripe system. This embodiment includes the spilt-burst concept with the modified portion in the later portion of a normal color burst envelope. The phase of the modified area is at 0° or at the −U relative to the average position of the normal PAL burst phase signals. In the earlier embodiment, the modified phase angle did not disturb the so called PAL ID pulse in the modified area. In this embodiment, the PAL pulse is maintained in the unmodified portion, whereas the color subcarrier phase is disturbed by the modified color burst having a phase angle 180° away (opposite) from the average value of the swinging burst. This embodiment is an effective copy protection system.

FIG. 12 shows another embodiment for a PAL color stripe system. This embodiment includes the split-burst concept with the modified portion in the later portion of a normal color burst envelope. The phase angle of the unmodified area is the normal swinging burst angle for the particular line. The modified portion has a phase angle set to be 180° from the swinging burst angle [∅A or ∅B] of the opposite swinging burst angle [(∅B) or (∅A)]. For example in line 1 as shown on FIG. 11, the unmodified burst area has the normal swinging burst angle, (135°) and the modified burst area has an angle of 45° (180° from the 225° angle of the opposite line's swinging burst). In line 2 of the sequence, the unmodified burst is at its normal 225° angle. The modified portion has a burst phase angle of 335° (180° from the 135° angle of the opposite line's swinging burst).

In the earlier embodiments, the modified phase angle did not disturb the so called PAL ID pulse in the modified area. In this embodiment, the PAL pulse is maintained in the unmodified portion, whereas the color subcarrier phase is disturbed by the modified color burst having a phase angle 180° away from the average value of the swinging burst. This embodiment is an effective copy protection system.

In each of the embodiments described above that involve an advanced or extended color burst envelope, the lines with normal burst signals throughout the burst envelope have a normal burst width. However, this disclosure is not limited to that condition. There may be conditions whereby all lines with a color burst signal will contain advanced and extended burst envelopes whether the burst has any phase modification or not.

An additional embodiment is to modify the horizontal sync width and/or position. One example would be to narrow the sync width by 1 to 2 $\mu$secs. and fill the extended blanking area with extended burst. Yet another example is to widen the horizontal sync by 1 to 2 $\mu$secs. and fill the extended horizontal sync with extended burst. Another variation is to move the leading edge of horizontal sync 1–2 $\mu$secs. and then the extended back porch with the modified color burst. Each of these additional embodiments are designed to improve the playability with a minimum of effect on the effectiveness of the copy protection.

Digital video tape recorders and digital play back devices are now becoming commercially available for consumer use. To maintain compatibility with analog video broadcast signals and analog video tape recorders, these consumer digital video tape recorders and digital playback devices will be "hybrid" digital and analog systems. Such systems will have the capabilities of current analog video cassette recorders to record and playback analog signals, while still having equivalent digital capabilities. Thus these new hybrid digital tape recorders will have the capability internally to convert input analog signals into digital signals, and record the digital signals as a digital data stream on the tape or disc. During playback the digital data stream from the tape or disc will be available both as a digital signal for display by a digital television set (not currently available) or be reconverted within a hybrid video tape or tape recorder or to a conventional analog video signal (such as the NTSC signal used in the United States.) The capability of the system internally to convert the received analog signals to a digital data stream will be important because currently there are no sources (either tape or broadcast) of digital video program material available to consumers.

Such hybrid video recorders employ a "consumer" digital recording format differing from the standards of present professional digital systems. Such digital video recorder will likely include a conventional "front end" RF tuner and also an RF modulator on the output side, as do present conventional analog VCRs. (By analog video here is meant NTSC, PAL, SECAM or YC.) The digital recording standard for consumers is essentially a data structure that represents the video signal as a stream of (binary) data bits along with suitable error concealment encoding, together with a physical tape standard.

Problems Posed by Digital Recording

Since digital video tape or disc recorders and digital playback devices will be capable of high fidelity reproduction which in turn will encourage copying, it is important that such recorders for consumer use be designed to inhibit or discourage unauthorized recording. For instance it is important to prevent use of recorders for illegally duplicating copy-righted video material, and also to prevent playing back of such illegally duplicated material. Currently available analog video copy protection techniques are not useful in the digital domain. Hence there is a need for a new copy protection system suitable for use with such hybrid digital and analog video tape recorders, where the material recorded on the tape is a digital data stream. A typical situation to be prevented is use of a hybrid video tape recorder to copy an output signal from a conventional VHS VCR, where the tape played back from the VHS VCR has a conventional copy protection process applied to it. The problem is to prevent the new hybrid digital-analog video tape recorder from copying the material from such a tape. Otherwise, the existence of such hybrid recorders would encourage copyright infringement.

A hybrid digital video recording system is described in U.S. Pat. No. 5,315,448 by Ryan issued on May 24, 1994 (incorporated by reference).

Integrated Circuit Implementation

A first apparatus embodiment comprises imbedding the color stripe technology along with other copy protection technology into an integrated circuit. The other copy protection technology comprises the technology described in U.S. Pat. Nos. 4,631,603 and 4,819,098 issued to Ryan on Dec. 23, 1986 and Apr. 4, 1989 respectively (incorporated by reference). Generally the integrated circuit includes a digital to analog converter to convert the digital video stream to an analog video stream which is encoded into an NTSC, PAL or YC format. The copy protection technology is added in the encoder stage and combined with the encoded output. The technology used in the integrated circuits is usually of the ASIC variety using multitudes of gates to produce the desired copy protection output waveform.

Figure 13A:
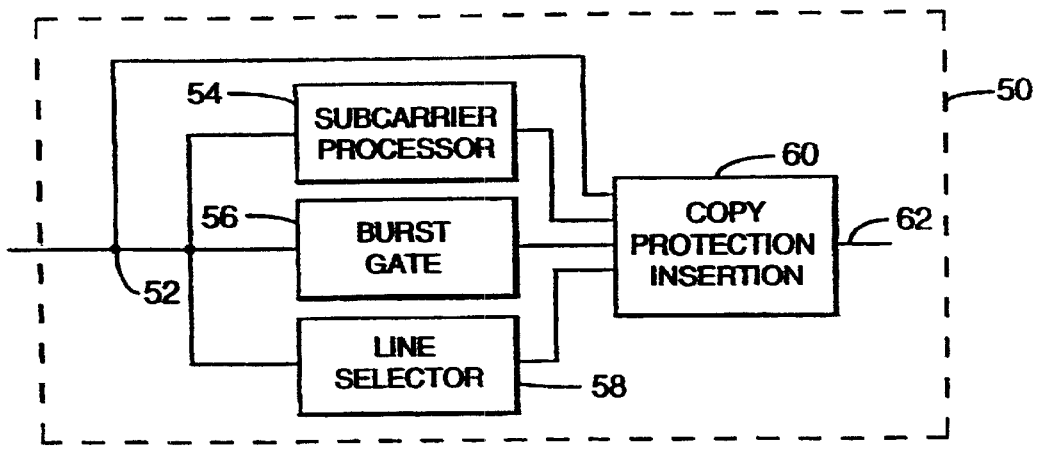
FIGS. 13A and 13B show block diagrams illustrating a general and exemplary apparatus covering the various embodiments of the color stripe process in accordance with the invention.

Three specific applications for such an integrated circuit incorporating the copy protection technology are the Digital Video Disc Players and Recorders, digital video cassette players and recorders and digital set-top boxes used in the cable industry and satellite to home industry. These specific applications include a programability of the integrated circuit permitting a change of the waveform parameters. In the case of a transmission system, the bits to change the default values of the waveform are transmitted with the signal. In the case of a DVD Player/Recorder and digital video cassette player/recorder the bits are included within the disc or cassette tape. FIG. 13A is a general block diagram of such an integrated circuit implementing the embodiments of the invention and the teachings of the '603 patent.

General Circuit

A second apparatus embodiment implementing the various embodiments described above is shown FIG. 13B.

Generally an apparatus to produce the various color stripe embodiments described above comprises: 1) a Subcarrier Processor, 2) a Burst Gate Generator and 3) a Line Generator.

FIG. 13A illustrates an exemplary circuit to produce a color stripe signal of the various embodiments described above.

A Copy Protection Apparatus 50 has an unmodified Video Input Signal 52. This signal may be a NTSC or PAL analog signal or a digital data stream representing a video signal to be copy protected. The input signal is inputted to a Copy Protection Inserter 60, a Subcarrier Processor 54, a Burst Gate Generator 56, and a Line Selector 58. The Subcarrier Processor 54 detects the color burst signal within Video Input Signal 52 and generates a 3.58 MHz. or a 4.43 MHz. subcarrier (depending on whether it is processing an NTSC or a PAL signal).

The Burst Gate Generator 56 is programmed to generate the appropriate gating signals for the Copy Protection Inserter 60 to instruct the Copy Protection Inserter to insert a normal phase subcarrier or a modified phase subcarrier.

The Line Selector 58 is programmed to instruct the Burst Gate Generator 56 and the Copy Protection Inserter which lines are to produce a modified burst and which line are to reproduce the burst signal present on the Video Input Signal 52. Apparatus 50 may be combined with the appropriate circuitry to produce the pseudo-sync AGC pulse pairs taught in the '603 patent.

Exemplary Circuit

Figure 13B:
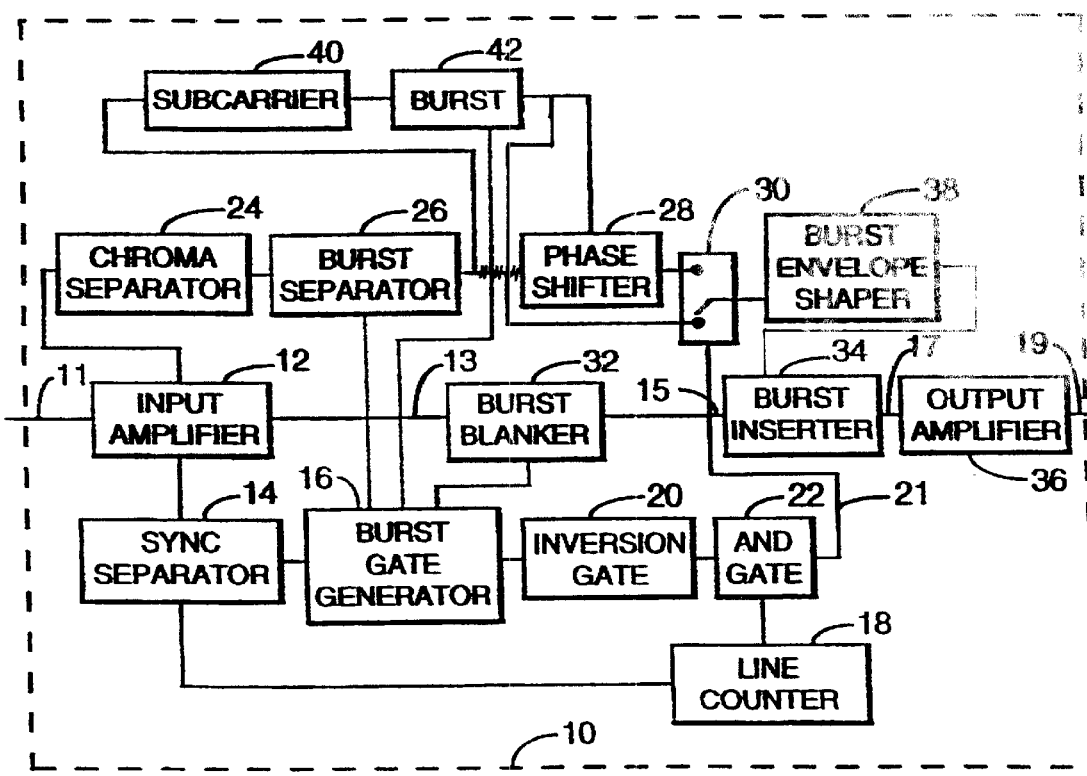

FIG. 13B is illustrative of an apparatus to implement the various embodiments discussed above. An improved color stripe system is implemented within the various elements of system 10. Each element within system performs functions well known to one skilled in the art of video engineering. A composite video signal 11 is inputted to Input Amplifier 12. Amplifier 12 sets the level of the video signal to an appropriate level for the remaining elements of the color stripe system.

A first output of Input Amplifier 12 is coupled to Sync Separator 14. Sync Separator 14 removes the horizontal and vertical synchronizing signals from the composite video for further use in improved color stripe system. Outputs of Sync Separator 14 are coupled to inputs of Burst Gate Generator 16 and Line Counter 18. Burst Gate Generator 16 uses the horizontal and vertical synchronizing pulses from Sync Separator 14 to produce a burst gate signal. In the NTSC format, the normal burst gate signal would begin approximately 5.3 microseconds after the leading edge of horizontal sync and end after the equivalent of 9 cycles of subcarrier (2.52 microseconds). Burst Gate Generator 16 is programmed to produce a widened burst gate on those lines where an advanced and/or extended burst gate is desired. Line Counter 18 uses the horizontal and vertical synchronizing pulses from Sync Separator 14 and is programmed to determine which lines will contain the color stripe information. An output of the Line Counter 18 is coupled to Burst Gate Generator 16 to instruct Burst Gate Generator 16 which lines require a widened burst gate. In one embodiment the ratio of lines having the color stripe signal to those not having the color stripe signal is $4/16$. That is four lines out of twenty in each field have the color stripe signal. Additionally, the line count is arranged so that comparable lines in each field contain the color stripe signal. This pairing up of the color stripe portions increases the visibility of the color stripe in the playback of the recorded signal.

A first output of Burst Gate Generator 16 is coupled to an Inversion Gate 20. Which determines which portions of the color burst signal will contain phase inverted color burst. Modification Gate 20 may be programmed to provide for inverted color burst phase in one or more parts of the color burst signal as shown in the various embodiments above.

A second output of Input Amplifier 12 is coupled to Chroma Separator 24. The output of Chroma Separator 24 comprises the chroma information and high frequency luminance information within the video signal. Since there is no luminance information during the color burst portion, there is only chroma information during the color burst portion of the output of Chroma Separator 24. The output of Chroma Separator 24 is coupled to a Burst Separator 26. Burst Separator 26 also has a burst gate input from the Burst Gate Generator 16.

The output of Burst Separator 26 contains only the color burst signal retrieved from Input Signal 11 via Chroma Separator 24 and Burst Separator 26.

The color burst signal from Burst Separator 26 is coupled to Subcarrier Oscillator 40 to produce a subcarrier signal synchronous with the incoming burst signal (3.58 MHz. in NTSC and 4.43 MHz. in PAL). An output of Subcarrier Oscillator 40 is coupled to Burst Generator 42. Burst Generator 42 also receives a Burst Gate Signal from Burst Gate Generator 16. The width of the burst signal generated by Burst Generator 42 is determined by the Burst Gate Generator. This may be varied by the combination of burst gates on lines having no modification being of one width and the lines with burst modification having a different width. These variation are determined by a combination of the Burst Gate Generator 16 and Line Counter 18.

The output of Burst Generator 42 is coupled to a Phase Shifter 28 and to the first input of Switch 30. In the NTSC system, the phase modification is generally 180°. In the PAL format, the Phase Shifter 28 may have an input from Line Counter 18 to instruct Phase Shifter 28 to produce different phase modifications on different lines as discussed above. Generally the phase modification in PAL is +90° on some lines and −90° on other lines. The output of Phase Shifter 28 is coupled to a second input of Switch 30. Inversion Gate 20 and Line Counter 18 are coupled to And Gate 22 to produce Control Signal 21. When And Gate 22 produces a signal indicating no burst phase modification requirement, Control Signal 21 places Switch 30 in a position to pass normal color burst. When And Gate 22 produces a signal indicating a need for color burst phase modification, Control Signal 21 places Switch 30 to pass inverted color burst. The output of Switch 30 may be coupled to a first input of Burst Inserter 34. However, the output preferably is supplied to the burst inserter 34 via a burst envelope shaper 38, as described below.

A third output of Input Amplifier 12 containing the processed input signal is coupled to an input of Burst Blanker 32. Another output of Burst Gate Generator 16 is coupled to Burst Blanker 32. Burst Blanker 32 blanks out all color burst information from Video Signal 13 using the burst gate signal from Burst Gate Generator 16. The output of Burst Blanker 32 containing Video Signal 15 is inputted to a second input of Burst Inserter 34. As discussed above Video Signal 15 has no color burst information. The output of Switch 30 contains the color stripe color burst generated by a combination of elements 24, 26, 28, 12, 14, 16, 18, 20, 22 and 30.

It has been determined in experimental testing that the effectiveness and playability of the modified signal are affected by shape of the color burst waveform. Therefore, the output of Switch 30 is coupled to the Burst Envelope Shaper 38 of previous mention that controls the rise and fall time of the color burst waveform. The output of Burst Envelope Shaper is then coupled to Burst Inserter 34 Burst Inserter 34 inserts the color stripe color burst with the Video Signal 15 which contains no color burst information to produce a composite video signal containing the improved color stripe color burst and its related composite video information.

The output of Burst Inserter 34 is coupled to Output Amplifier 36. Output Amplifier 36 provides the appropriate signal processing to produce a composite video signal with the correct levels and output impedance for use in a video system.

This disclosure is illustrative and not limiting. Further modifications will be apparent to one skilled in the art and are intended to fall within the scope of the appended claims.

We claim:

1. A method of improving the playability of a copy protected original video signal, the copy protected original video signal including a plurality of video lines with selected video lines including a color stripe burst having a predetermined duration and a selected phase other than a normal color burst phase, the method comprising:

determining the duration of the color stripe burst in the selected video lines of the original video signal; and modifying a phase of a selected portion or portions of said duration of the color stripe burst in chosen lines of the selected lines to be the phase of the normal color burst, whereby the playability of the copy protected original video signal is improved.

2. The method of claim 1, wherein the modifying includes shifting the selected phase of She portion or portions of the color stripe burst by 180°.

3. The method of claim 1, wherein the selected phase of the color stripe burst is from about 20° to 180°.

4. The method of claim 1, wherein up to 60% of the duration of the color stripe burst is modified.

5. The method of claim 1, wherein a duration of the color stripe burst is eight to ten cycles of a color subcarrier signal, and the act of modifying includes modifying up to four to six of the cycles.

6. The method of claim 1, wherein in each video field at least one band of video lines is subject to the modifying of the portion or portions of the color stripe burst, followed by a band of video lines which are not subject to the modifying of the portion or portions of the color stripe burst.

7. The method of claim 1, wherein a normal color burst phase portion precedes a selected phase portion of the color stripe burst.

8. The method of claim 1, wherein a selected phase portion precedes a normal color burst phase portion of the color stripe burst.

9. The method of claim 1, wherein a first selected phase portion precedes a normal color burst phase portion and a second selected phase portion follows the normal color burst phase portion.

10. The method of claim 1, wherein a first normal color burst phase portion precedes the selected phase portion and a second normal color burst phase portion follows the selected phase portion of the color stripe burst.

11. The method of claim 1, wherein the original video signal is an original NTSC video signal.

12. The method of claim 1, where the original video signal is an original PAL video signal.

13. The method of claim 1 wherein a video line includes a horizontal sync signal, further including:

modifying the horizontal sync signal position and/or width.

14. The method of claim 1 including:

reducing the amplitude of a selected portion of the color stripe burst.

15. A method of improving the playability of a copy protected original video signal, the copy protected original video signal including a plurality of video lines with selected video lines including a color stripe burst having a predetermined duration and a selected phase other than a normal color burst phase, the method comprising:

increasing the duration of the color stripe burst in the selected lines of the copy protected original video signal; and modifying a phase of one or more portions of the extended duration of the color stripe burst to be other than the selected phase, whereby the playability of the copy protected original video signal is improved.

16. The method of claim 15, wherein increasing the duration of the color stripe burst comprises beginning the color stripe burst duration before a normal color burst duration.

17. The method of claim 15, wherein increasing a duration of the color stripe burst comprises ending the color stripe burst duration after a normal color burst duration.

18. The method of claim 15, wherein increasing a duration of the color stripe burst comprises beginning a color stripe burst duration before a normal color burst duration and ending the color stripe burst duration after a normal color burst duration.

19. The method of claim 15, wherein a modified color stripe burst duration begins at a tailing edge of a respective horizontal sync.

20. The method of claim 15, wherein a modified color stripe burst duration begins between a leading edge of a respective horizontal sync and a trailing edge of the horizontal sync.

21. The method of claim 15, wherein an end of a modified color stripe burst duration is at the beginning of a respective active video line.

22. The method of claim 15, wherein the modification of a duration of the color stripe burst comprises:

increasing the duration of the color stripe burst by adding a first portion to the color stripe burst duration between the trailing edge of a respective horizontal sync and the beginning of a duration of a normal color burst; and further increasing the duration of the color stripe burst by adding a second portion following the duration of the normal color burst that ends prior to the beginning of a respective active video line.

23. The method of claim 22, wherein the phase modification comprises:

modifying a phase of a first portion of the modified color stripe burst duration; and retaining a normal color burst phase in a second portion of the modified color stripe burst duration.

24. The method of claim 15, wherein the original video signal is an original NTSC video signal.

25. The method of claim 15, where the original video signal is an original PAL video signal.

26. The method of claim 15 wherein increasing the duration including adding extra cycles of the selected phase other than the normal color burst phase prior to the existing color stripe burst.

27. The method of claim 15 wherein increasing the duration includes adding cycles of the selected passe other than the normal color burst phase in the region of the horizontal sync and extending to the existing color stripe burst.

28. The method of claim 15 wherein a video line includes a horizontal sync signal, further including:

modifying the horizontal sync signal position and/or width.

29. An apparatus for modifying an original video signal so as to improve the playability of the original video signal, the original video signal including a plurality of video lines with selected video lines including a color stripe burst having a predetermined duration and a selected phase other than a normal color burst phase, comprising:

a burst gate generator receiving the original video signal for producing a burst gate signal;

a copy protection insertion device coupled to receive the burst gate signal;

a line selector receiving the original video signal for producing a line count to indicate to the copy protection insertion device which lines of the original video signal are to be modified;

a subcarrier processor receiving the original video signal for modifying a portion(s) of the predetermined duration of the color stripe burst signals; and a video input for also supplying the original video signal to the copy protection insertion device;

wherein the combination of die outputs from the subcarrier processor, the burst gate generator and the line selector are supplied to the copy protection insertion device to modify the video signal so as produce a copy protection video signal, whereby the playability of the original video signal is improved.

* * * * *

UNITED STATES PATENT AND TRADEMARK OFFICE
CERTIFICATE OF CORRECTION

| | |
|---|---|
| PATENT NO. | : 6,516,132 B1 |
| APPLICATION NO. | : 09/091661 |
| DATED | : February 4, 2003 |
| INVENTOR(S) | : Wrobleski et al. |

It is certified that error appears in the above-identified patent and that said Letters Patent is hereby corrected as shown below:

In Column 16 at line 31 delete "She" and insert --the--.

Signed and Sealed this

Twenty-second Day of August, 2006

JON W. DUDAS
*Director of the United States Patent and Trademark Office*